United States Patent [19]

Aoyama

[11] Patent Number: 6,027,142
[45] Date of Patent: Feb. 22, 2000

[54] DEVICE FOR JOINTING FEEDING HOSE

[76] Inventor: Yoshitaka Aoyama, 20-11, Makitsukadai 2-cho, Sakai-shi, Osaka 590-01, Japan

[21] Appl. No.: 08/081,374

[22] PCT Filed: Nov. 1, 1991

[86] PCT No.: PCT/JP91/01503

§ 371 Date: Jul. 1, 1993

§ 102(e) Date: Jul. 1, 1993

[87] PCT Pub. No.: WO93/08956

PCT Pub. Date: May 13, 1993

[51] Int. Cl.[7] ............................................. F16L 3/02
[52] U.S. Cl. .................... 285/61; 285/148.3; 285/288.1; 285/417; 285/420
[58] Field of Search .................... 285/5, 61, 62, 285/63, 64, 417, 114, 115, 148.3, 288.1, 420

[56] References Cited

U.S. PATENT DOCUMENTS

| | | | |
|---|---|---|---|
| 723,347 | 3/1903 | Wessinger | 285/61 |
| 1,487,517 | 3/1924 | Krause | 285/61 |
| 1,632,206 | 6/1927 | Tolman | 285/61 X |
| 1,716,531 | 6/1929 | Persons | 285/114 X |
| 4,826,219 | 5/1989 | Proehl | 285/114 X |

FOREIGN PATENT DOCUMENTS

| | | | |
|---|---|---|---|
| 2711360 | 9/1978 | Germany | 285/114 |

*Primary Examiner*—Dave W. Arola
*Attorney, Agent, or Firm*—Pollock, Vande Sande & Amernick

[57] ABSTRACT

A device for jointing feeding hose appropriate to such a case as jointing a feeding hose made of synthetic resin to a part-feeding metallic pipe, in which a guiding base plate (20) in the shape of a single plate is connected to a part-feeding pipe (5) and said guiding base plate (20) is provided with a cylindrical holding part (23) for receiving a feeding hose (12) as a mating member so that a fixing piece (25) of the feeding hose is fixed to the guiding base plate (20) in a position spaced from said cylindrical holding part (23).

5 Claims, 3 Drawing Sheets

DEVICE FOR JOINTING FEEDING HOSE

FIELD OF THE INVENTION

The present invention relates to an improved joint device of a joint hose for use with a parts-supply hose, which is suited for linking a plastic-made supply hose with a metallic tube supplying metallic parts for example.

BACKGROUND OF THE INVENTION

FIGS. 5 through 7 respectively illustrate examples of conventional joint devices. Of these, FIG. 5 represents a conventional device which supplies a projection nut 1 to an objective steel plate (not shown) by operating a supply rod 2. The supply rod 2 is movably accommodated in a guide tube 3. A guide pin 4 is secured to the tip of the supply rod 2. Although not shown, the supply rod 2 is linked with a piston rod of a pneumatic cylinder.

A parts-supply tube 5 is connected to the bottom end of the guide tube 3 via welding. As shown in FIG. 6, the parts-supply tube 5 is of rectangular section, and yet, it bends in the direction of the bottom line. An outlet aperture 6 is provided along the bottom edge of the parts-supply tube 5 creating an opening and the bottom space is closed by a stopper plate 7 shown to the right of FIG. 5. A permanent magnet 8 is built in the stopper plate 7 in order to attract the nut 1 so that it can provisionally be held in contact with the stopper plate 7. An arm 9 is externally welded to the guide tube 3. A bolt 10 threaded through the arm 9 forces the stopper plate 7 against the guide tube 3 so that the stopper plate 7 can be secured to the guide tube 3. A joint tube 11 is connected to the upper edge of the parts-supply tube 5 via welding. A plastic-made supply hose 12 is tightly inserted in the joint tube 11.

Another example of a conventional joint device shown in FIG. 7 has a joint tube 13 which is provided with a large-diametric dimension 15 and a small-diametric dimension 16 across a boundary step 14 created by tightly inserting a supply hose 17 and a parts-supply tube 18 through tube 13. The joint tube 13 is coupled with a stationary member via a fixing member 19 represented by dashed lines.

Nevertheless, according to the conventional structure shown in FIG. 5, since the supply hose 12 is merely inserted in the joint tube 11, the supply hose 12 is apt to shake itself loose. In an extreme case, the supply hose 12 may be disengaged from the joint tube 13. If an unwanted bending moment acts upon the supply hose 12, then a stepped section may be generated at the boundary between the supply hose 12 in the inner passageway and the parts-supply tube to result in an obstruction to smoothly transfer the nut 1. Likewise, even when the supply hose 12 is withdrawn slightly clearance is generated to also obstruct smooth delivery of the nut 1. Likewise, although the supply hose 17 must precisely be engaged with the parts-supply tube 18 at the boundary step 14, according to the conventional structure shown in FIG. 7, if the coupling position deviates to the left of the joint device shown in FIG. 7 by the slightest amount, then, it will cause an unwanted bending moment to be generated which would merely result in an obstruction to smoothly transfer the nut 1 as in the above cases. Furthermore, since the joint tube 13 is necessarily manufactured by molding means, it is by no means advantageous in terms of the production cost.

BRIEF DESCRIPTION OF THE INVENTION

Therefore, the invention has been achieved to fully solve those technical problems described above by providing an improved joint device. The improved joint device according to the invention features the structure described below. A guide base plate comprising a single plate is combined with a parts-supply tube, wherein a cylindrical supporting member for accommodating an incoming supply hose is secured to the guide base plate in order that a stopper plate for retaining the supply tube can be secured to the guide base plate at a position remote from the cylindrical supporting member. Structurally, the supply hose is inserted in the supporting cylindrical member along the guide base plate to bring the supply hose into close contact with the parts-supply tube to have the cylindrical supporting member strongly support the supply tube.

DETAILED DESCRIPTION OF THE INVENTION

Figure 1:
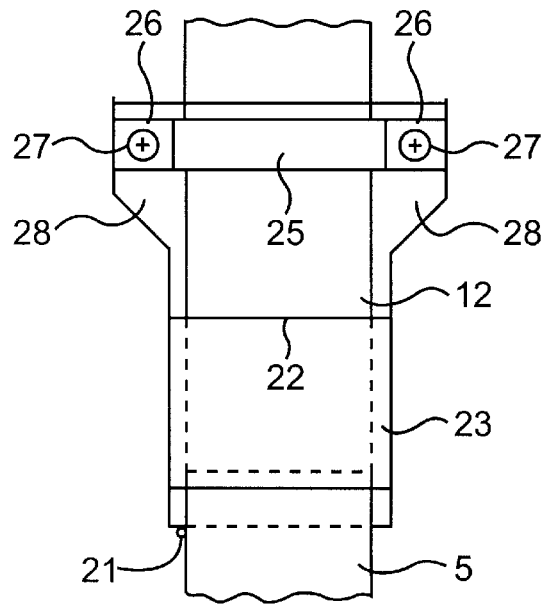
FIG. 1 is a front view of the joint device according to the invention.
Figure 2:
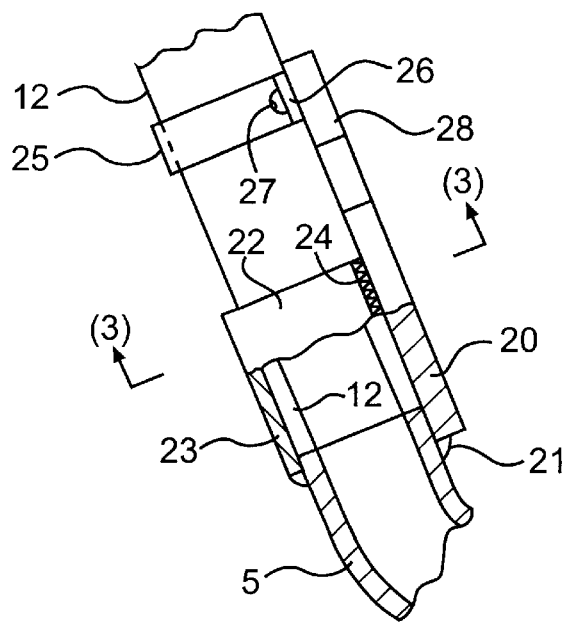
FIG. 2 is a lateral view of the joint device shown in FIG. 1 in conjunction with a partial sectional view thereof.
Figure 3:
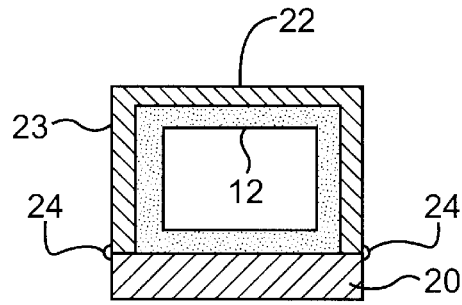
FIG. 3 is a sectional view of the joint device across line 3—3 shown in FIG. 2.

Referring to FIGS. 1 through 3, structural detail of the improved joint device according to the invention is described below. The improved structure achieved by the invention is applied to a parts-supply tube 5 of a conventional joint device shown in FIG. 5. As indicated by the reference numeral 21 shown in FIG. 2, a guide base plate 20 is secured to a curved section on the external surface of a parts-supply tube 5 via welding. A cylindrical supporting member 23 is formed by welding a U-shaped sectional member 22 onto the guide base plate 20. The reference numeral 24 shown in FIGS. 2 and 3 designates welded domains. As shown in FIGS. 2 and 3, the guide base member 20 has a slightly slender form. A clamp member 25 is secured to a position remote from the cylindrical supporting member 23. The clamp member 25 is provided in order to prevent supply hose 12 from shaking itself free. The clamp member 25 may be composed of a frame-shape plate spring or a clip-shape spring. However, when implementing this embodiment of the invention, a slender iron plate is folded into a generally U-shaped configuration, where a pair of flanges 26 are respectively secured by a pair of bolts 27. To accommodate 26 and 27, a pair of expanded flanges 28 are provided on both sides and at one-end of the guide base plate 20. Assembly sequence is described below.

Initially, a pair of bolts 27 on both sides of the guide base plate 20 are loosely held. Next, the supply hose 12 is inserted in the stopper member 25 and further through the cylindrical supporting member 23 by slidably shifting it over the guide base plate 20. Next, when the top surface of the supply hose 12 comes into close contact with the parts-supply tube 5, a pair of bolts 27 are tightly fastened to enable the stopper member 25 to tightly secure the supply hose 12 onto the guide base plate 20.

Figure 4:
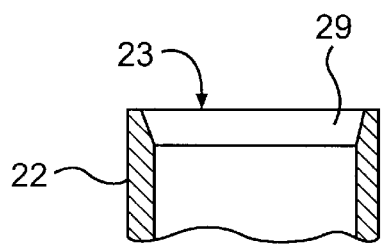
FIG. 4 is a lateral sectional view illustrating part of the cylindrical supporting member.

FIG. 4 illustrates the state in which an enlarged space 29 is formed by obliquely cutting off the interior of an edge portion of the cylindrical supporting member 23 so that the supply hose 12 can smoothly proceed to the interior of the cylindrical supporting member 23.

According to the invention, a guide base plate 20 composed of a single plate is combined with a parts-supply tube 5, where a cylindrical supporting member 23 is set to the guide base plate 20 in order to accommodate an incoming supply hose 12 within the cylindrical supporting member 23. A clamp member 25 for retaining the supply hose 12 is secured to the guide base plate 20 at a position remote from the cylindrical supporting member 23. Consequently, the invention can provide those advantageous effects described below.

Figure 7:
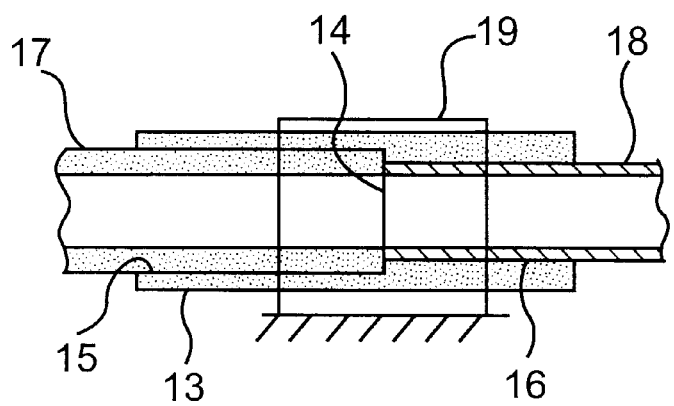
FIG. 7 is a vertical sectional view of another conventional joint device.

Specifically, since the supply hose 12 is solidly fixed by the clamp member 25 after fully being inserted in the cylindrical supporting member 23, there is no fear of causing the supply hose 12 to shake itself free. Furthermore, there is no fear of generating an unwanted step on the surface of the passageway for transferable parts, and yet, owing to the force exerted by the clamp member 25, the supply hose 12 is securely prevented from being disengaged from the joint tube. Furthermore, since the invention provides an improved structure based on the guide base plate, it is no longer necessary to manufacture such a joint tube having the structure shown in FIG. 7.

Figure 5:
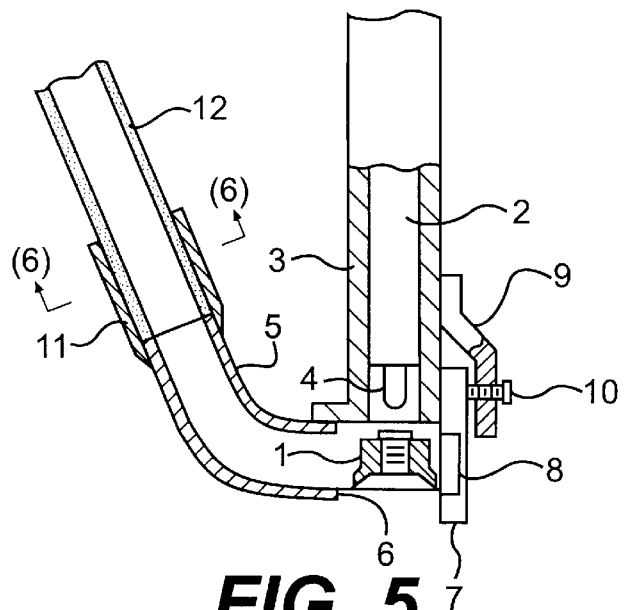
FIG. 5 is a vertical sectional view of a conventional joint device.
Figure 6:
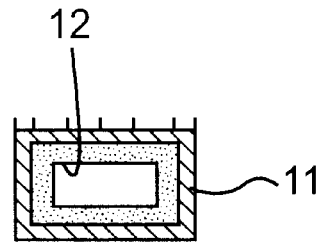
FIG. 6 is a sectional view of the conventional joint device across line 6—6 shown in FIG. 5.

Furthermore, as is easily comprehensible from the combined structure shown in FIGS. 2 and 5, in the case of providing the joint device shown in FIG. 5 with the improved structure of the invention fundamentally using the guide base plate 20, the clamp member 25 can easily be engaged with and disengaged from the joint device, and in addition, a compact structure can also be realized.

What is claimed is:

1. A joint device for use with a parts feeder apparatus, the joint device comprising:

a parts supply tube; a supply hose a base plate integrally secured to the parts supply tube;

a generally U-shaped supporting member fastened to the base plate receiving the parts supply tube and the supply hose therein, the hose being in-line with the parts supply tube to create a continuous passageway therebetween; and a clamp member secured to the base plate in spaced relationship to the U-shaped supporting member clamping the supply hose against the base plate and securing an end of the supply hose in abutting contact with a confronting end of the parts supply tube thereby eliminating a gap therebetween.

2. The device of claim 1 wherein the U-shaped support member comprises:

parallel arms positioned perpendicular to the base plate;

a bight section connecting the arms; and an open section positioned against the base plate.

3. The device of claim 1 wherein the U-shaped support member forms a quadrilateral channel therethrough and the supply hose and parts supply tube are of quadrilateral cross section.

4. The device of claim 1 wherein the parts supply tube is made of metal and the supply hose is made of plastic.

5. The device of claim 1 wherein the clamp member includes flanges positioned against corresponding flanges formed in the base plate; and further wherein fasteners pass through the flanges of the clamp member and the base plate.

* * * * *